May 21, 1935.   C. SAUZEDDE   2,001,749

VALVE ASSEMBLY FOR COMPENSATORS

Filed April 11, 1932   2 Sheets-Sheet 1

INVENTOR
Claude Sauzedde

BY

ATTORNEYS

May 21, 1935.  C. SAUZEDDE  2,001,749

VALVE ASSEMBLY FOR COMPENSATORS

Filed April 11, 1932   2 Sheets-Sheet 2

INVENTOR
Claude Sauzedde
BY
ATTORNEYS

Patented May 21, 1935

2,001,749

UNITED STATES PATENT OFFICE 2,001,749

VALVE ASSEMBLY FOR COMPENSATORS

Claude Sauzedde, Detroit, Mich., assignor to Detroit Hydrostatic Brake Corporation, Detroit, Mich., a corporation of Michigan Application April 11, 1932, Serial No. 604,504

10 Claims. (Cl. 60—54.6)

The present invention pertains to a valve construction of a type particularly adapted for use in compensators in hydrostatic braking systems that are used to compensate for volumetric changes of the liquid contained therein and provide means for controlling the supply of liquid from the compensator to the braking system when such changes occur as a result of radical atmospheric temperature variations, wearing of the braking members, or any loss of fluid that might occur through leakage, the present application being a continuation in part of the application filed September 17, 1931, Serial No. 563,327, for Compensator for hydraulic braking systems.

The primary object of the present invention is to provide a valve construction for controlling the flow of fluid from the compensator to the pressure-producing compressors that are independently operated by a foot pedal to force the fluid therefrom into lines that lead to the front and rear wheels of an automobile or the left and right wheels of an aircraft. The foot pedal operated compressors, in combination with which the present valve especially serves, are operated in separate systems so that failure of one system to operate (as a result of a broken line for example) does not handicap or interfere with the operation of the other and it is therefore necessary that each compressor be provided with an individual connection to the compensator and the present valve operates in a manner to positively shut off both lines of communication that lead from the compensator to the compressors.

With the above and other ends in view the invention consists in matters hereinafter set forth and more particularly pointed out in the appended claims, reference being had to the accompanying drawings, in which Figure 1 is a fragmentary diagrammatic view illustrating a compensator equipped with the present valve mechanism and installed in a double braking system;

Like characters of reference are employed throughout to designate corresponding parts.

Figure 1:
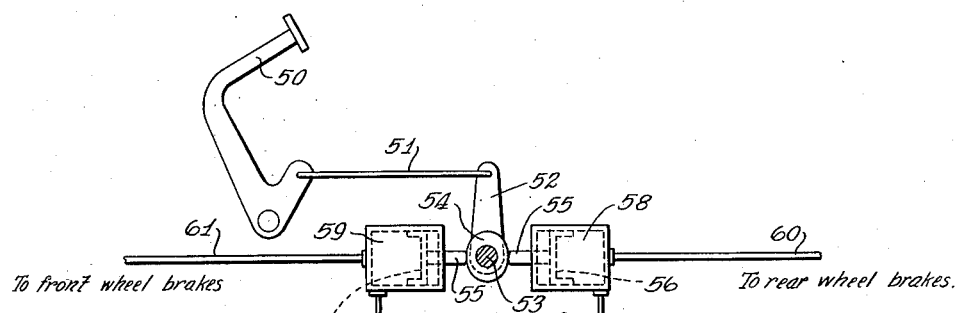
Figure 2:
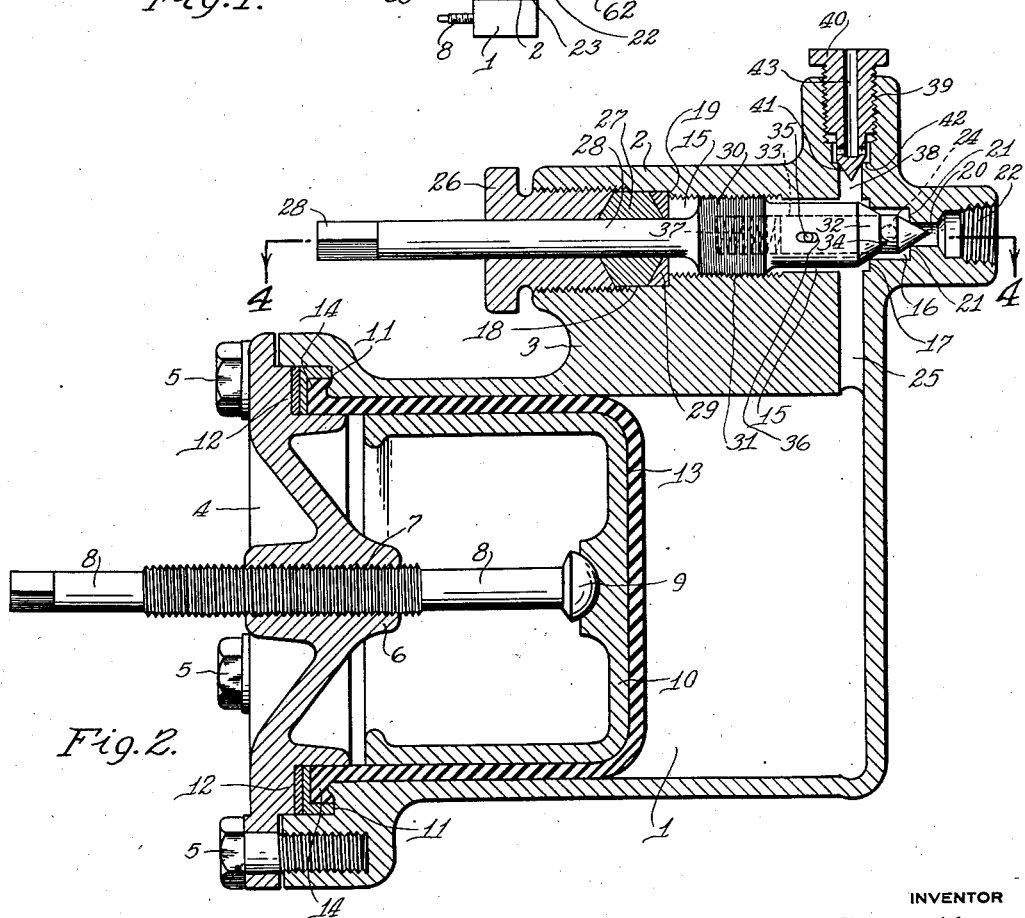
Fig. 2 is a vertical cross sectional view through the present valve and compensator.
Figure 3:
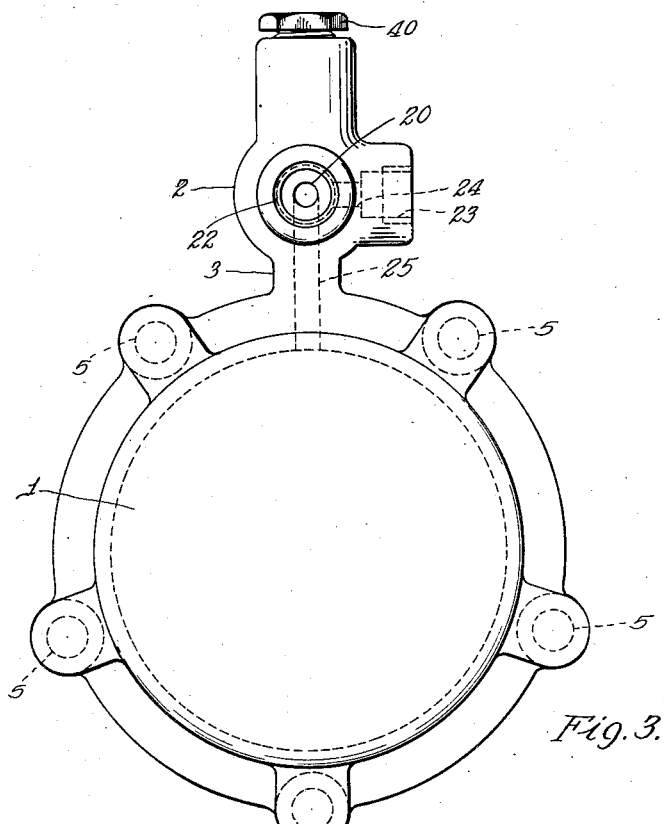
Fig. 3 is an end view of the compensator illustrating the present valve body formed integral therewith.
Figure 4:
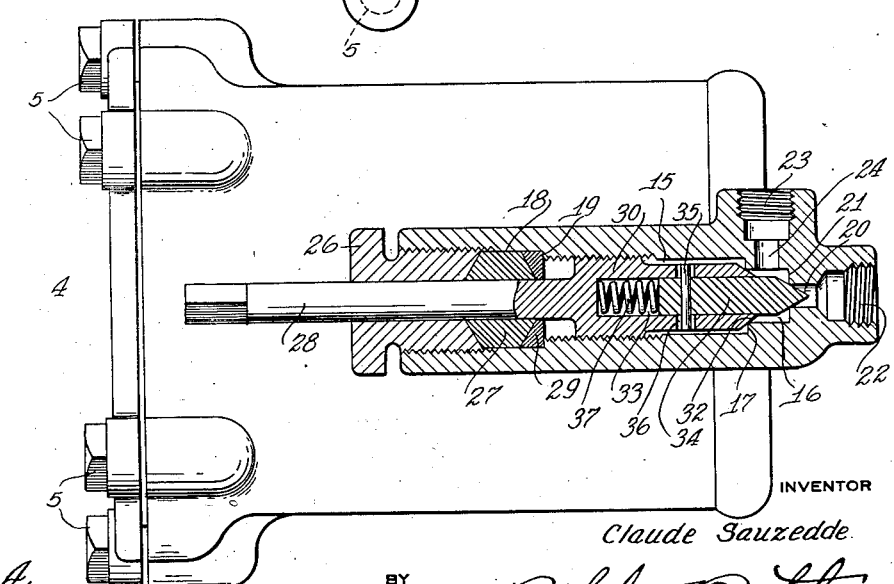
Fig. 4 is a cross sectional view taken along the lines 4—4 of Fig. 2.

The numeral 1 indicates the cylindrical body of a compensator and 2 a cylindrical valve body which is supported above said compensator body by a web 3 that is formed integral with both said compensator and valve bodies. A closure cap 4 is secured on the end of the compensator cylinder 1 by means of bolts 5, the closure cap being provided with a concentrically disposed rib-stiffened boss 6 which is axially drilled and threaded as at 7 to receive a screwthreaded rod 8 having a rounded head 9 that engages a piston 10 that is received in the compensator cylinder 1. The outer end of the cylinder is recessed to form a shoulder 11 and a projection 12 is formed on the closure cap 4 and a cup shaped sealing member 13 which completely covers the piston 10 is provided with an outwardly projecting flange 14 that is tightly interposed between the shoulder 11 and the projection 12 on the closure 4 so that it becomes impossible for fluid in the compressor body to contact the piston. The sealing member 13 is formed of an expansible flexible material so that it may stretch to permit movement of said piston inwardly as a result of pressure caused by rotation of the screwthreaded rod 8.

In the valve body 2 is formed an internally screwthreaded bore 15 that communicates with a bore 16 of smaller diameter in a manner to form a shoulder 17 and with a bore 18 of larger diameter in a manner to form a shoulder 19. A passage 20 is formed concentric with the bore 15 and forms a shoulder 21, the passage 20 serving to connect the bore 15 to an outlet port 22. An outlet port 23 is connected by a passage 24 to the bore 16 and a passage 25 provides a means of communication between the compensator cylinder 1 and the bore 15.

An axially pierced externally threaded packing gland 26 is received in the outer end of the bore 18 and compresses packing 27 around a valve stem 28 and against an angularly faced seat washer 29 abutting against the shoulder 19. A head 30 is formed on the valve stem 28 and has a screwthreaded portion 31 received in the screwthreaded bore 15 and the inner end of the head is formed conical as at 32 and is adapted to seat on the shoulder 17 to prevent communication between the bore 15 and the bore 16. The conical valve thus formed may be seated or unseated by rotating the stem 28.

The valve head 30 is provided with a concentric bore 33 in which is slidably received a plug 34 having a conically shaped outer end adapted to seat on the shoulder 21 to prevent communication between the bore 16 and passage 20. The plug 34 is held in the valve head 30 by a pin 35 that is received in slots 36 in the valve head so that a limited sliding movement is permitted.

A compressed coil spring 37 normally tends to force the plug 34 outwardly.

Communicating with the bore 15 by means of a vertically extending passage 38 is an outlet port 39 that receives a bleeder valve plug 40 having a conical inner end 41 that seats on the shoulder 42 and a passage 43 through which air or liquid may pass when the valve portion 41 is off its seat 42. The bleeder valve serves as an outlet for air in order that none need be trapped in the braking system.

In Fig. 1 there is illustrated a brake pedal 50 that is connected by a link 51 and lever 52 to a shaft 53 that carries a cam 54. The cam 54 engages piston rods 55 that push the pistons 56 and 57 in their respective cylinders 58 and 59. The chamber 58 is connected by a line 60 to hydrostatically operated rear wheel brakes (not shown) and the cylinder 59 is connected by a line 61 to hydrostatically operated front wheel brakes (not shown).

In operation the vehicle brakes are actuated by downward movement of the pedal 50 which causes rotation of the cam 54 to reciprocate the pistons 56 and 57 and thereby force the liquid from the cylinders 58 and 59 into the lines 60 and 61 which lead to the brakes. After the brakes have been in use for a period of time it becomes necessary to add an additional amount of fluid into the cylinders 58 and 59. The additional fluid is supplied by the present compensator through a pipe 62 that connects the cylinder 58 to the port 22 and through a pipe 63 that connects the cylinder 59 to the port 23.

As will be understood the compensator unit provides a number of advantages in this particular service. For instance, it is possible to equalize the pressures between the service lines at any time by simply opening the valve unit which has the effect of placing the cylinders and the supply in open communication; at such time, the entire fluid system, including the compensator, is intercommunicating, so that if unequal pressure conditions have developed the entire system is opened to equalization even though a new supply is not provided. While such open communication is thus available, the valve unit, in closed position, closes each part of the system from communication, so that the several service lines are maintained individual. And, as will be understood, the valve movements to open position initially open up the entrance to line 63 to the supply, further movement of the valve being required to open up line 62 to the supply—the closing movement of the valve unit reverses this condition. As a result, the communication is opened and closed by stages, thus ensuring against surging or other excessive conditions.

When an additional amount of fluid is required in the cylinders 58 and 59 the valve stem 28 is rotated in a direction to cause it to be retracted as a result of the screwthreaded head 30 engaging the internally threaded bore 15. When the head 30 has been retracted a sufficient amount the conical portion 32 is clear of the shoulder 17 and communication is permitted between the bore 15 and the bore 16. At the same time the head 30 carries the plug 34 so that the conical end thereof no longer engages the shoulder 21 and communication is thereby permitted between the bore 16 and the outlet 22. When the valves are in the open position as described movement of the piston 10 forces the fluid from the cylinder 1 into the passage 25 which leads to the bore 15. From the bore 15 the fluid is forced into the bore 16 from which it passes to the outlet ports 22 and 23 to be carried by the lines 62 and 63 to the cylinders 58 and 59.

When the required amount of fluid has been forced into the cylinders 58 and 59 the valve head 30 is moved inwardly by rotating the stem 28 until the conical end thereof engages the shoulder 17 to positively prevent communication between the lines 62 and 63 and the bore 15 while at the same time the plug 34 seats on the shoulder 21 and prevents communication between the two lines 62 and 63 which both normally open into the bore 16.

In order that no air that might become trapped in the compensator or the valve body shall become forced into the lines 62 and 63 the bleeder valve 40 is provided. Before opening the valves 32 and 34 the bleeder valve is retracted so that the conical end 41 is off the seat 42 and the piston 10 is moved until liquid shows in the passage 43 at which time the valve is closed and the compensator is in readiness for supplying fluid to the compressors 58 and 59 in the manner described above.

Although a specific embodiment of the present invention has been illustrated and described it is to be understood that various changes may be made in the details of construction without departing from the spirit of the invention as set forth in the appended claims, and such changes are contemplated.

What I claim is:—

1. In braking systems operative under hydrostatic conditions and including a pair of individual service lines, a fluid pressure cylinder and piston for each line, means for concurrently actuating the pistons during the brake application cycle, and a supply and regulating unit and its casing, said unit including a supply chamber, individual connections between the unit and the several cylinders, a valve seat between the unit entrances of said individual connections, a valve seat intermediate said supply chamber and one of said entrances, a single manually-operated valve unit for controlling both seats, said valve unit forming the sole control between the supply and the service lines, and pressure means within the supply chamber and operable at will, whereby the valve unit in open position is operative to provide communication between the supply and both cylinders to permit equalization of pressure in the service lines and supply concurrently.

2. A unit as in claim 1 characterized in that the valve unit includes a body portion operative with one seat and a spring-supported member operative with the second seat.

3. A unit as in claim 1 characterized in that the valve unit includes a body portion operative with the seat intermediate the supply and one of the entrances, and a spring-supported member movable relative to the body portion and operative with the other seat, whereby valve movements will initially open the supply to one entrance and initially close the supply to the other entrance.

4. A unit as in claim 1 having additionally a manually-controlled air-relief means in open communication with the supply.

5. A unit as in claim 1 characterized in that the seats are coaxial relative to a bore having varied diameters and open to the supply and both entrances, the valve unit being movable in the direction of length of the bore.

6. A unit as in claim 1 characterized in that the seats are coaxial relative to a bore having varied diameters and open to the supply and both entrances, the valve unit having a threaded engagement with the bore.

7. A unit as in claim 1 characterized in that the pressure means includes a closure for the supply chamber and a piston having a threaded engagement with the closure.

8. In braking systems operative under hydrostatic conditions, and including a pair of individual service lines together with means for concurrently actuating the service fluid of such lines during the brake application cycle, a supply and compensating unit for such lines operable at will, said unit including an expansible supply chamber for the compensating fluid, individual connections between the unit and said service lines, a passageway connecting said chamber with one of said lines and with which the other line is in open communication, and valve means operative within said passageway to control communication therethrough, said valve means including a pair of co-axial seats, one of said seats being intermediate the respective points of communication of the service lines with said passageway, and a valve structure co-operative with said seats and operative to open and close said passageway at said seats progressively at will by rotative movements of the valve structure, whereby communication between the chamber and the service lines may be controlled to provide fully-open and/or fully-closed communication conditions by valve structure movements in one direction of rotation, the structure being operative to prevent communication between the service lines while permitting chamber communication with one of such lines when the structure is within an intermediate zone of such rotative movement.

9. A unit as in claim 8 characterized in that the expansible chamber is of the piston and cylinder type, with the piston manually controllable.

10. A unit as in claim 8 characterized in that the chamber is of the piston and cylinder type, with the piston manually controllable and with the chamber sealed to limit fluid loss to fluid passing the valve structure.

CLAUDE SAUZEDDE.